United States Patent [19]

Burns

[11] 4,045,959

[45] Sept. 6, 1977

[54] EXPANDED RING BELLOWS

[75] Inventor: Dallas D. Burns, Brooklyn Park, Minn.

[73] Assignee: Honeywell Inc., Minneapolis, Minn.

[21] Appl. No.: 559,289

[22] Filed: Mar. 17, 1975

[51] Int. Cl.² .................... F01B 19/08; F01B 29/08
[52] U.S. Cl. ................................. 60/632; 89/1 R
[58] Field of Search ........... 60/632, 633, 634, 635, 60/663, 637, 638; 152/349, 350, 351; 244/146; 9/11 A

[56] References Cited

U.S. PATENT DOCUMENTS

| 882,905 | 3/1908 | Marsh | 152/349 |
|---|---|---|---|
| 1,478,677 | 12/1923 | Rogers | 244/146 |
| 1,603,312 | 10/1926 | Burdette | 152/349 |
| 2,124,062 | 7/1938 | Grant et al. | 9/11 A |
| 2,339,548 | 1/1944 | Wilson | 152/349 |
| 2,497,084 | 2/1950 | Irby | 60/635 |
| 2,564,209 | 8/1951 | Murphy | 60/632 |
| 2,575,071 | 11/1951 | Rockwell | 60/632 |
| 2,629,115 | 2/1953 | Hansen | 9/11 A |
| 2,656,996 | 10/1953 | Holland | 244/146 |
| 2,764,766 | 10/1956 | Boyle et al. | 9/11 A |
| 2,912,902 | 11/1959 | Nessler | 60/632 X |
| 3,119,302 | 1/1964 | Barr | 60/632 |
| 3,339,218 | 9/1957 | Stamberger | 9/11 A |
| 3,432,182 | 3/1969 | Solipasso | 9/11 A X |
| 3,529,417 | 9/1970 | Knight | 60/636 |

*Primary Examiner*—Wendell E. Burns
*Attorney, Agent, or Firm*—John S. Munday

[57] ABSTRACT

A self-erecting structure, including a plurality of unexpanded convoluted bellows means joined together to define an enclosed ring having an interior closed path, along with means for expanding the path. The means for expanding the path include a quantity of propellant contained within the interior closed path in an amount capable of expanding the plurality of bellows to significantly increase the size of the ring upon ignition of the propellant and ignition means for igniting the propellant upon receipt of a command.

4 Claims, 3 Drawing Figures

EXPANDED RING BELLOWS

BACKGROUND OF THE INVENTION

There is a need in many applications for a device which would be capable of changing its dimensions from a smaller first dimension to a larger second dimension upon command and within a reasonably fast period of time. The desirability of light weight permits inclusion of the device in apparatus which is weight sensitive, such as for example, air borne devices of the type used in the aerospace industry. Fast operation is desirable, particularly in air borne apparatus, because quick action is extremely useful in rapidly changing conditions. Moreover, such a device, were it able to support at least its own weight upon expansion, would be a useful device without the need of additional supporting apparatus and additional weight.

Accordingly, an object of this invention is to provide a light, self-erecting structure.

Another object of this invention is to provide a device capable of fast expansion from one size to another, larger size.

Yet another object of this invention is to provide a device capable of expanding to a new and larger size resulting in a relatively stiff final structure capable of supporting at least its own weight in a predetermined position.

Other objects will appear hereinafter.

DESCRIPTION OF THE INVENTION

It has now been discovered that the above and other objects of this invention may be accomplished in the following manner. Specifically, it has been discovered that a self-erecting structure capable of rapid expansion of size may be developed which is both light in weight and capable of standing on its own strength. Specifically, a plurality of unexpanded convoluted bellows means are joined together to define an enclosed ring having an interior closed path. Expansion means are provided for placing a quantity of pressure generating material such as a gas within the enclosed path to cause expansion of the bellows convolutions. Means for causing the expansion means to operate are also provided.

DESCRIPTION OF THE DRAWINGS

For a more complete understanding of the invention, reference is hereby made to the drawings, in which:

As shown in FIG. 1, a self erecting structure is shown generally by the reference numeral 10. This device consists of a ring of a plurality of unexpanded convoluted bellows means 12 joined together to form an enclosed interior path 15 having an approximate diameter D1. An igniter means 14 is provided. The igniter means 14 is connected to leads 16 and 17 for transmission of an ignition signal from a control apparatus not shown.

The shape of the bellows before expansion is optional, but upon expansion by internal pressurization, the device will assume a configuration consistent with uniform material stresses in the convoluted bellows case. If the bellows case is fabricated from a homogeneous material with uniform linear convolutions, the final configuration will normally be a large torus or doughnut shaped figure. The expansion ratio of the initial diameter to the final diameter will depend upon the depth and spacings of the original bellows convolutions, the internal pressure generated during expansion, and the physical properties of the bellows case material. Various means may be used to internally pressurize the bellows, with a preferred means being pyrotechnic gas generation.

Figure 1:
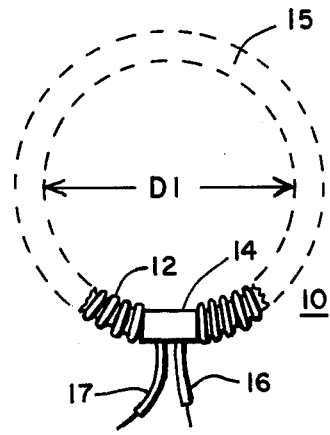
FIG. 1 is a partial view of one embodiment of the present invention in an unexpanded mode.
Figure 2:
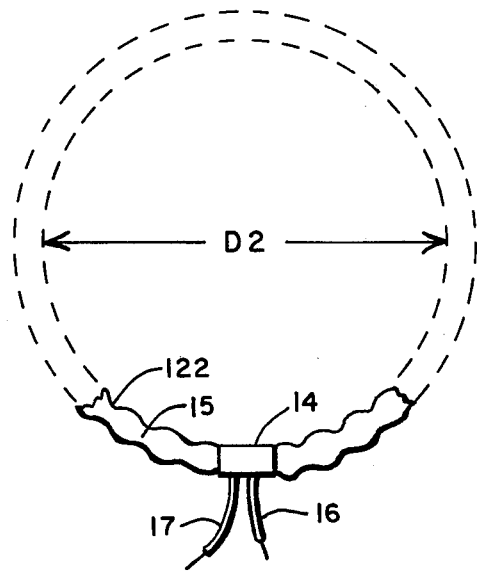
FIG. 2 is a partial view of the same embodiment as shown in FIG. 1 in an expanded form.

FIG. 2 shows generally the effect of expansion of the device as shown in FIG. 1. Specifically, the bellows 12 in FIG. 1 have expanded to a new, expanded shape, 122, giving the apparatus a diameter D2. Increase of the diameter from D1 to D2 is accomplished by generation of an internal pressure within the enclosed path by a propellant charge 15 which is capable of expanding the bellows.

The device as described herein is really a light weight, self erecting structure and as such has a number of potential applications. One such potential application is the self erecting antenna for space craft where light weight features are highly desirable. In most applications, the bellows would be a one time device, primarily because its unique features are most pronounced upon utilization of high expansion ratios. This occurs when the bellows case is expanded beyond its yield strength to achieve a relatively stiff final structure. Particularly, if a pyrotechnic expansion scheme is utilized, the internal pressures decay through thermal loss and the final structure would be self supporting by virtue of the material properties of the expanded bellows case. It is possible, however, that the device could be used for cyclical operation if a means of cyclical pressurization is used without exceeding the yield strength of the bellows case. Such a device would require maintenance of the internal pressure to continue rigidity of the expanded device.

Figure 3:
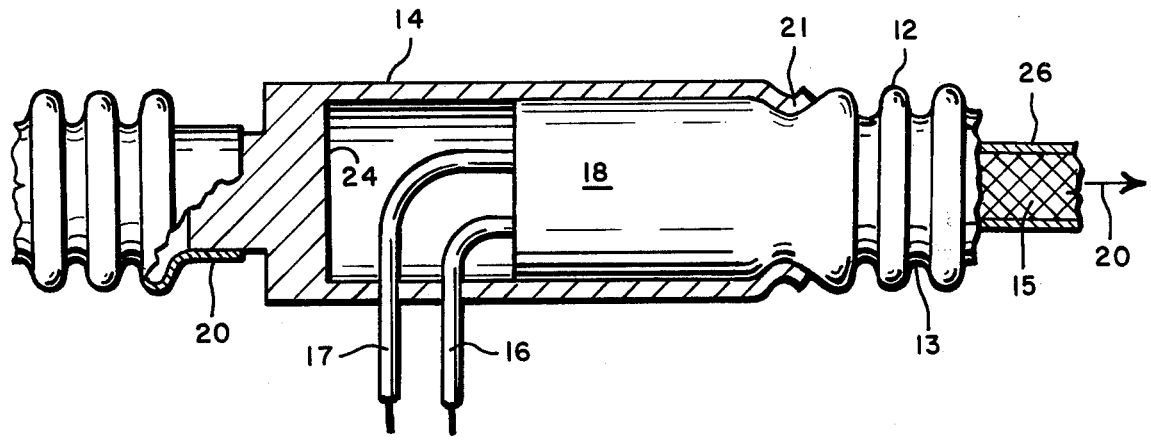
FIG. 3 is a sectional view of the igniter used in the device shown in FIG. 1.

As shown in FIG. 3, the ignition means 14 may be of the type utilizing pyrotechnic generation of gas. Specifically, the bellows 12 are joined to the expansion means 14 through typical joints 20 and 21. In the embodiment shown in FIG. 3, wall 24 prevents passage of fluid in the direction to the left of the drawing so that pressure passes in a counterclockwise direction around the full direction of the enclosed path. It would be equally feasible to have a communication passage so that the generation of gas would be in both directions, causing expansion uniformly from the ignition means 14.

As has been stated, the gas is generated in the direction of arrow 20. A tube 26 may be placed inside the passageway to prevent direct impingement of the hot gas onto the bellows 13 at the point of greatest intensity, and to insure uniform expansion of the bellows. This tube 26 may further include additional quantities of the propellant to be ignited and may be utilized to generate an initial direction for the passage of gas during rapid expansion to prevent undue stress on the portion of the ring closest to the expansion means 14. The bulk of the gas generating propellant may be contained in container 18 for ignition by passage of a current through lines 16 and 17.

To demonstrate the efficiencies of the present invention, a ring bellows of the type described herein was installed in the periphery of a small hemispherical parachute having an outside diameter of approximately 12 inches. The ring bellows was actuated upon command and a generation of gas was achieved, driving the mouth of the parachute open under flight conditions.

Activation was rapid, in that the ring bellows was capable of opening the mouth of the parachute in approximately 10 milliseconds. This opening was positive in that approximately 1,000 pounds per square inch of internal pressure was generated.

Having thus described the invention, what is claimed is:

1. A self-erecting structure, comprising:
   a plurality of unexpanded convoluted bellows means joined together sequentially defining an enclosed tubular ring having an interior circular path and a first diameter; and
   activation means for generating sufficient pressure within said enclosed path to increase said first diameter to a second diameter of significantly greater size.

2. The device of claim 1 wherein said expansion means comprises a quantity of propellant means contained within said interior closed path in an amount capable of expanding said plurality of bellows to significantly increase the size of said ring.

3. The device of claim 2 which further includes ignition means for igniting said propellant upon receipt of a command.

4. The device of claim 1 which further includes tube means within said closed path for direction of gas generated by said activation means along said path.

* * * * *